US006857083B2

(12) United States Patent
Floyd et al.

(10) Patent No.: US 6,857,083 B2
(45) Date of Patent: Feb. 15, 2005

(54) METHOD AND SYSTEM FOR TRIGGERING A DEBUGGING UNIT

(75) Inventors: Michael S. Floyd, Leander, TX (US); Paul J. Jordan, Austin, TX (US); Larry S. Leitner, Cedar Park, TX (US)

(73) Assignee: International Business Machines Corporation, Armonk, NY (US)

( * ) Notice: Subject to any disclaimer, the term of this patent is extended or adjusted under 35 U.S.C. 154(b) by 705 days.

(21) Appl. No.: 09/740,530

(22) Filed: Dec. 18, 2000

(65) Prior Publication Data

US 2002/0129309 A1 Sep. 12, 2002

(51) Int. Cl.[7] ................................................ G06F 11/00
(52) U.S. Cl. ........................................ 714/30; 712/227
(58) Field of Search .............................. 714/30, 36, 32, 714/33, 35, 45; 712/227

(56) References Cited

U.S. PATENT DOCUMENTS

| 5,621,886 | A | * | 4/1997 | Alpert et al. ................ 714/38 |
| 5,978,937 | A | * | 11/1999 | Miyamori et al. ............ 714/45 |
| 6,289,473 | B1 | * | 9/2001 | Takase ........................ 714/35 |
| 6,615,370 | B1 | * | 9/2003 | Edwards et al. .............. 714/45 |
| 6,668,339 | B1 | * | 12/2003 | Maeda ........................ 714/38 |
| 2002/0152427 | A1 | * | 10/2002 | Ok .............................. 714/34 |
| 2002/0194543 | A1 | * | 12/2002 | Veenstra et al. ............. 714/39 |

* cited by examiner

Primary Examiner—Robert Beausoliel
Assistant Examiner—Christopher McCarthy
(74) Attorney, Agent, or Firm—Cardinal Law Group; Casimer K. Salys (57) ABSTRACT

A processor core for transitioning a debugging unit between a plurality of operating states generates trace data as it processes operating signals of an instruction stream. The processor core provides a trigger event signal to the debugging unit in response to a trigger instruction signal within the instruction stream that is representative of triggering instruction for transitions debugging unit to one of (1) a base operating state, (2) a dynamic storage operating state or (3) a static storage operating state. Concurrently or alternatively, the processor core can provide the trigger event signal to the debugging unit as a function of generated trigger data in response to additional operational instructions within the instruction stream.

32 Claims, 4 Drawing Sheets

FIG. 1

METHOD AND SYSTEM FOR TRIGGERING A DEBUGGING UNIT

BACKGROUND OF THE INVENTION

1. Field of the Invention

The present invention generally relates to triggering a debugging unit, and in particular, a microprocessor configured in accordance with an instruction set architecture for transitioning a debugging unit between a plurality of operating states as directed by trigger instruction signals within an instruction stream.

2. Description of the Related Art

The arrangement of components on an integrated circuit increases in complexity with each improvement in the manufacturing capability of constructing additional transistors onto smaller chips. Thus, in order to meet market demand, adequate and timely testing and debugging of integrated circuits has become a priority.

Currently, there exist several methods of testing and debugging components of an integrated circuit by controlling and/or monitoring a storage of trace data by a debugging unit. One method includes marking instruction addresses of a sequence of operating instructions that are suspected of generating a problem within the integrated circuit. A storage of trace data commences upon an execution of the suspected operating instructions, and ceases after the execution of the suspected operating instructions. Another method includes marking an operating instruction to commence a storage of trace data upon the execution of the operating instruction, and marking a subsequent operating instruction to cease a storage of trace data upon the execution of the subsequent operating instruction. An additional method includes detecting a particular pattern of trace data being provided via a bus to a trace array. Yet another method includes generating signals internal to a multi-state logic analyzer for controlling an operation of a trace array in selectively storing trace data.

All of the aforementioned methods of testing and debugging components of an integrated circuit have not always produced consistent and reliable results. The computer industry is therefore continually striving to improve upon the monitoring of trace data by a debugging unit.

SUMMARY OF THE INVENTION

The present invention provides a structure and method for placing special triggering instructions only in those selected locations where there is a desire to capture a trace of the failing instruction stream. This is in contrast to the prior art where the marking of general instructions can initiate numerous unintended and undesirable triggers from the processor core to the debugging unit, in that the instructions subject to such marking can occur many times in the instruction stream and not just in the failing case where debugging is desired.

One form of the present invention is a method for transitioning a debugging unit between a plurality of operating states. First, operating instructions are defined. The operating instructions are to operate a processing core. Second, a first triggering instruction is defined. The first triggering instruction is to provide a first signal to the debugging unit whereby the debugging unit is operable to transition from a first operating state to a second operating state. Third, the first triggering instruction is embedded within the operating instructions.

A second form of the present invention is a microprocessor comprising a debugging unit and a processor core. The debugging unit is operable to transition from a first operating state to a second operating state in response to a first signal. The processor core is operable to fetch an instruction stream including a second signal representative of a first triggering instruction to transition the debugging unit from the first operating to the second operating state. The processor core is further operable to provide the first signal to the debugging unit in response to the second signal.

A third form of the present invention is a computer readable medium comprising a first computer readable code and a second computer readable code embedded within the first computer readable code. The first computer readable code is to operate a processor core. The second computer readable code is to transition a debugging unit from a first operating state to a second operating state.

A fourth form of the present invention is a system for transitioning a debugging unit between a plurality of operating states. The system comprises a computer readable medium and a processor core. The computer readable medium is operable to provide a first signal representative of a first computer readable code to transition a debugging unit from a first operating state to a second operating state. The processor core is operable to provide a second signal to the debugging unit in response to the first signal whereby the debugging unit is operable to transition from the first operating state to the second operating state.

The foregoing and other features and advantages of the invention will become further apparent from the following detailed description of the presently preferred embodiments, read in conjunction with the accompanying drawings. The detailed description and drawings are merely illustrative of the invention rather than limiting, the scope of the invention being defined by the appended claims and equivalents thereof.

DETAILED DESCRIPTION

Figure 1:
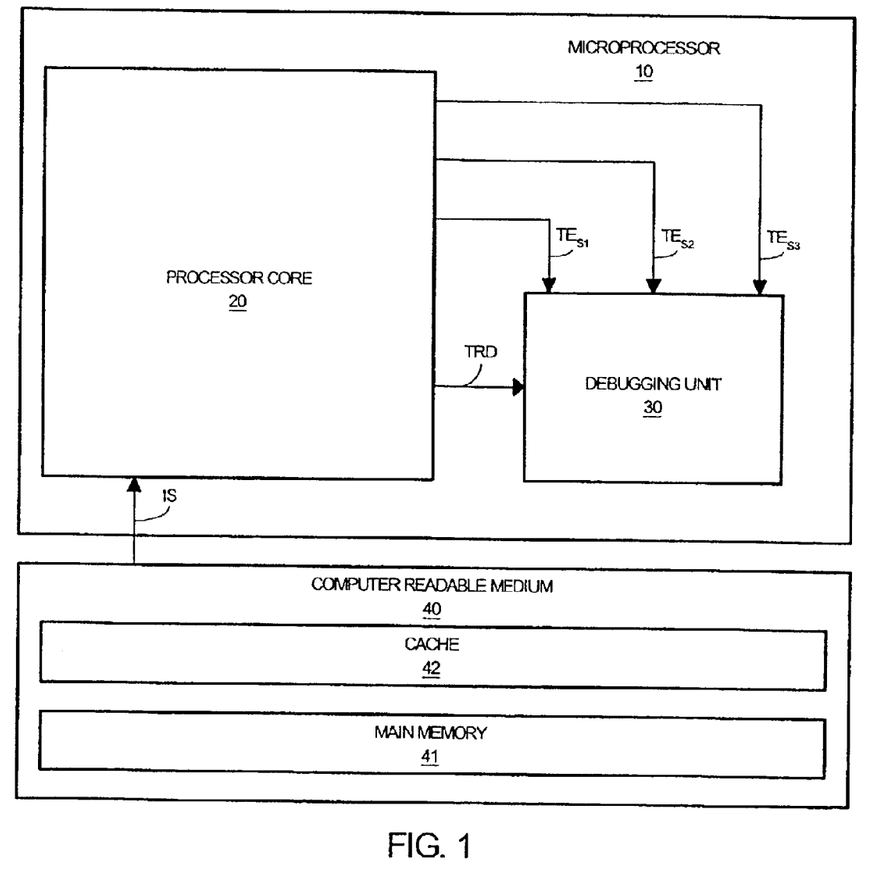
FIG. 1 is a block diagram of a first embodiment of a microprocessor and a computer readable medium in accordance with the present invention.

Referring to FIG. 1, a microprocessor 10 in accordance with the present invention is shown. Microprocessor 10 includes a processor core 20, and a debugging unit 30. Processor core 20 is a compilation of circuitry for fetching, decoding, and executing an instruction stream IS of operating signals from a main memory 41 and/or a cache 42 of computer readable medium 40. Processor core 20 provides trace data TRD to debugging unit 30 as the operating signals of instruction stream IS are being processed by processor core 20. Debugging unit 30 is a state machine for selectively storing trace data TRD within an internal memory component. The present invention configures processor core 20 and computer readable medium 40 in accordance with an instruction set architecture of the present invention that enables processor core 20 to provide a trigger event signal $TE_{S1}$, a trigger event signal $TE_{S2}$, and/or a trigger event signal $TE_{S3}$ to debugging unit 30 in response to trigger instruction signals within instruction stream IS. For purposes of the present invention, a triggering instruction signal is defined as a non-operative signal, i.e. the architecture state of processor core 20 does not change in response to the triggering instruction signal. This is to be distinguished from an operating instruction that changes the architecture state of processor core 20 as processor core 20 executes the operating instruction. Debugging unit 30 transitions to a base operating state in response to trigger event signal $TE_{S1}$, i.e. a reset signal. Debugging unit 30 transitions to an operating state for dynamically storing trace data TRD within its internal memory component in response to trigger event signal $TE_{S2}$, i.e. a start signal to write trace data TRD into the internal memory. Debugging unit 30 transitions to an operating state for statically storing trace data TRD within its internal memory component in response to trigger event signal $TE_{S3}$, i.e. a stop signal to hold trace data TRD previously written into the internal memory.

In other embodiments of the present invention, debugging unit 30 can be omitted from microprocessor 10, and an electrical communication can be established between microprocessor 10 and an external logic analyzer as would occur to one skilled in the art. In yet other embodiments of the present invention, a central processing unit having processor core 20 or portions thereof, and/or debugging unit 30 or portions thereof formed by multiple integrated circuits can be substituted for microprocessor 10.

Figure 2A:
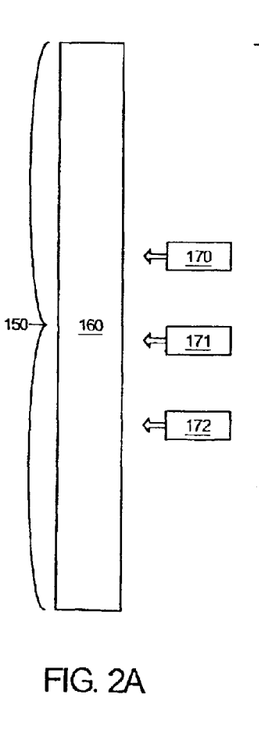
FIG. 2A is a block diagram of a first embodiment of testcase in accordance with the present invention.
Figure 2B:
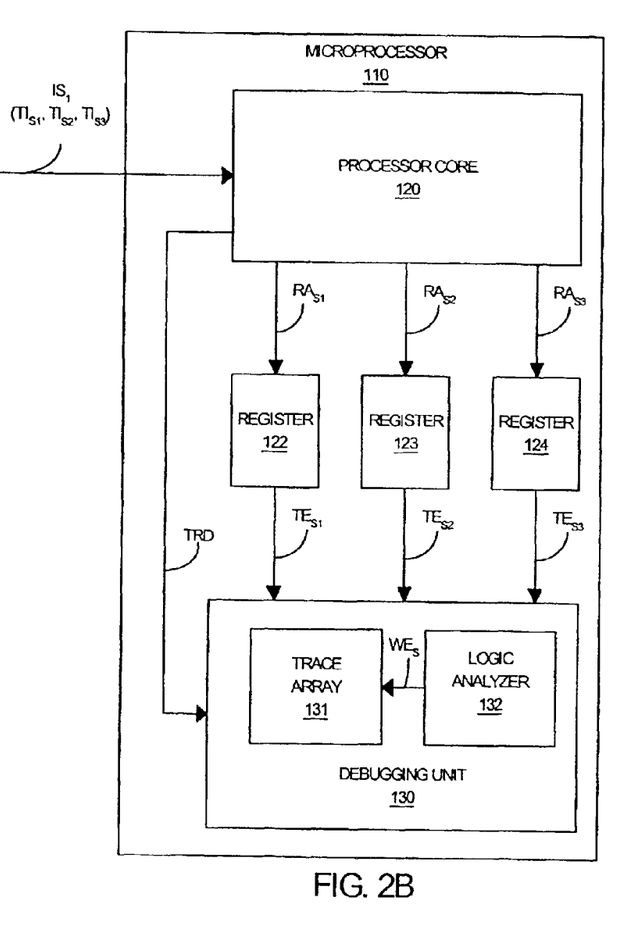
FIG. 2B is a block diagram of a second embodiment of a microprocessor in accordance with the present invention.

"Referring to FIGS. 2A and 2B, a testcase 150 and a microprocessor 110 in accordance with an instruction set architecture of the present invention is shown. Testcase 150 includes operating instructions 160, a triggering instruction 170, a triggering instruction 171, and a triggering instruction 172. Operating instructions 160 is for operating a processor core 120 of microprocessor 110. Triggering instruction 170 is for transitioning a debugging unit 130 of microprocessor 110 to a base operating state. Triggering instruction 171 is for transitioning debugging unit 130 to an operating state whereby trace array 131 dynamically stores trace data TRD from a processor core 120 of microprocessor 110 (hereinafter "the dynamic storing operating state"). Triggering instruction 172 is for transitioning debugging unit 130 to an operating state whereby trace array 131 statically stores trace data TRD (hereinafter "the static storage operating state"). Triggering instruction 170, triggering instruction 171, and triggering instruction 172 are strategically embedded within operating instructions 160 to sequentially transition debugging unit 130 between the base operating state, the dynamic storage operating state, and the static storage operating state."

Testcase 150 is coded within main memory 41 (FIG. 1) or cache 42 (FIG. 1). Processor core 120 fetches an instruction stream $IS_1$ including operating signals (not shown) that are representative of operating instructions 160, a trigger instruction signal $TI_{S1}$ that is representative of triggering instruction 170, a trigger instruction signal $TI_{S2}$ that is representative of triggering instruction 171, and a trigger instruction signal $TI_{S3}$ that is representative of triggering instruction 172.

Processor core 120 includes a register 122, a register 123, and a register 124. Register 122, register 123, and register 124 are shown as being separate from processor core 120 to simplify the description of processor core 120.

Processor core 120 provides a register address signal $RA_{S1}$ to register 122 in response to trigger instruction signal $TI_{S1}$. Register 122 provides trigger event signal $TE_{S1}$ (FIG. 1) to debugging unit 130 in response to register address signal $RA_{S1}$. A logic analyzer 132 of debugging unit 130 transitions debugging unit 130 to the base operating state in response to trigger event signal $TE_{S3}$.

"Processor core 120 provides a register address signal $RA_{S2}$ to register 123 in response to trigger instruction signal $TI_{S2}$. Register 123 provides trigger event signal $TE_{S2}$ (FIG. 1) to debugging unit 130 in response to register address signal $RA_{S2}$. Logic analyzer 132 transitions debugging unit 130 to the dynamic storage operating state in response trigger event signal $TE_{S2}$. Specifically, logic analyzer 132 provides a write enable signal $WE_S$ to trace array 131 in response to trigger event signal $TE_{S2}$. Trace array 131 dynamically store trace data TRD in response to write enable signal $WE_S$."

"Processor core 120 provides a register address signal $RA_{S3}$ to register 124 in response to trigger instruction signal $TI_{S3}$. Register 124 provides trigger event signal $TE_{S3}$ (FIG. 1) to debugging unit 130 in response to register address signal $RA_{S3}$. Logic analyzer 132 transitions debugging unit 130 to the static storage operating state in response trigger event signal $TE_{S2}$ $T_{S3}$. Specifically, logic analyzer 132 ceases any provision of write enable signal $WE_S$ to trace array 131 in response to trigger event signal $TE_{S3}$. Trace array 131 statically stores any trace data TRD written into trace array 131 during the static storage operating state."

It is to be appreciated that the processing of trigger instruction signal $TI_{S1}$, trigger instruction signal $TI_{S2}$, and trigger instruction signal $TI_{S3}$ by processor core 120 transitions debugging unit 130 between the base operating state, the dynamic storage operating state, and the static storage operating state. Consequently, upon the completion of processing instruction stream $IS_1$ by processor core 120, the trace data TRD stored within trace array 131 is representative of the results of processing portions of testcase 150 by processor core 120.

Figure 3A:
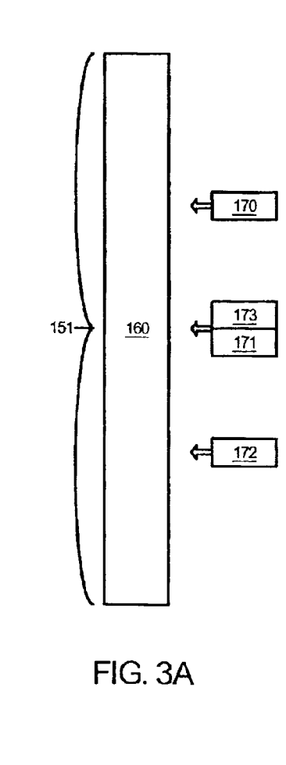
FIG. 3A is a block diagram of a second embodiment of a testcase in accordance with the present invention.
Figure 3B:
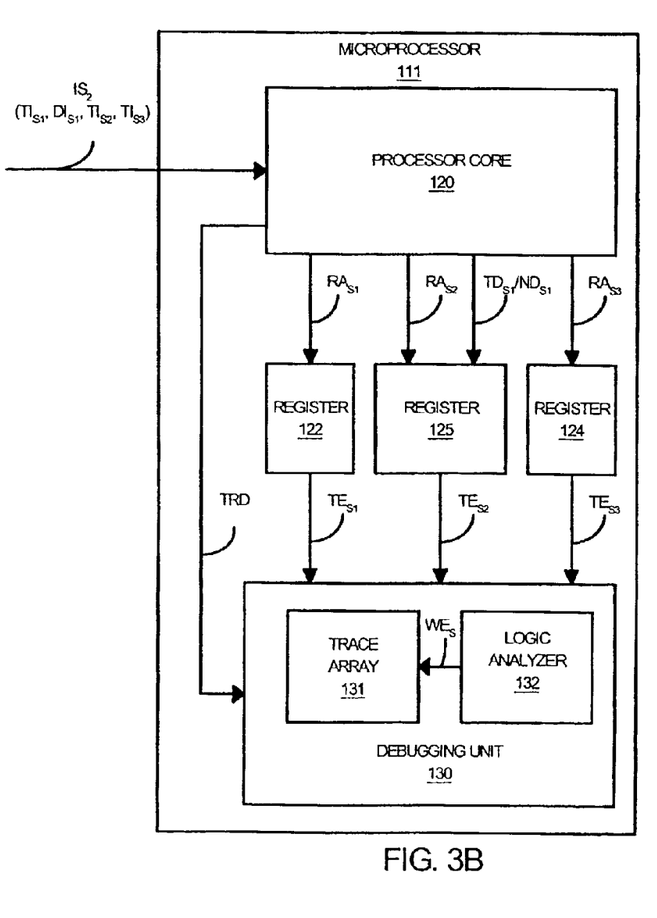
FIG. 3B is a block diagram of a third embodiment of a microprocessor in accordance with the present invention.

"Referring to FIGS. 3A and 3B, a testcase 151 and a microprocessor 111 in accordance with an instruction set architecture of the present invention is shown. Testcase 151 includes operating instructions 160 (FIG. 2A), triggering instruction 170 (FIG. 2A), a set of operating instructions 173, triggering instruction 171 (FIG. 2A), and triggering instruction 172 (FIG. 2A). Operating instructions 173 are for generating trigger data or non-event data. Triggering instruction 170 and triggering instruction 172 are strategically embedded within operating instructions 160 to transition debugging unit 130 to the base operating state and the static storage operating state, respectively. Operating instructions 173 and triggering instruction 171 are sequentially and strategically embedded within operating instructions 160 to optionally transition debugging unit 130 to the dynamic storage operating state."

Testcase 151 is coded within main memory 41 or cache 42 (FIG. 1). Processor core 120 fetches an instruction stream $IS_2$ including operating signals (not shown) that are representative of operating instructions 160, trigger instruction signal $TI_{S1}$ (FIG. 2B), trigger instruction signal $TI_{S2}$ (FIG. 2B), trigger instruction signal $TI_{S3}$ (FIG. 2B), and a data instruction signals $DI_{S1}$ that is representative of operating instructions 173.

Processor core 120 includes register 122 (FIG. 2B), register 124 (FIG. 2B), and a register 125. Register 122, register 124, and register 125 are shown as being separate from processor core 120 to simplify the description of processor core 120.

Processor core 120 provides register address signal $RA_{S1}$ to register 122 in response to trigger instruction signal $TI_{S1}$. Register 122 provides trigger event signal $TE_{S1}$ (FIG. 1) to debugging unit 130 in response to register address signal $RA_{S1}$. Logic analyzer 132 transitions debugging unit 130 to the base operating state in response to trigger event signal $TE_{S1}$.

"In response to data instruction signals $DI_{S1}$, processor core 120 provides either a trigger data signal $TD_{S1}$ to register 25 when processor core 120 generates trigger data, or provides a non-event data signal $ND_{S1}$ to register 25 when processor core 120 generates the non-event data. For example, processor core 120 can perform a XOR operation of two general purpose registers (not shown) in response to data instruction signals $DI_{S1}$. The contents of one register can be a pre-defined constant. The contents of the other register can be a testcase number for test case 151 that matches the pre-defined constant, or any other number. Trigger data can be defined as the result of a match of the pre-defined constant and the testcase number for testcase 151, i.e. the XOR operation yielding all zeros. Non-event data can be defined as the results of a mismatch of the pre-defined constant and any other number, i.e. the XOR operation yielding some ones."

Subsequent to a provision of either trigger data signal $TD_{S1}$ or non-event data signal $ND_{S1}$ by processor core 120, processor core 120 provides register address signal $RA_{S2}$ to register 125 in response to trigger instruction signal $TI_{S2}$. Register 125 provides trigger event signal $TE_{S2}$ (FIG. 1) to debugging unit 130 in response to register address signal $RA_{S2}$ and trigger data signal $TD_{S1}$. Logic analyzer 132 transitions debugging unit 130 to the dynamic storage operating state in response to trigger event signal $TE_{S2}$. Register 125 does not provide trigger event signal $TE_{S2}$ (FIG. 1) to debugging unit 130 in response to register address signal $RA_{S2}$ and no-event data signal $ND_{S1}$.

"Processor core 120 provides register address signal $RA_{S3}$ to register 124 in response to trigger instruction signal $TI_{S3}$. Register 124 provides trigger event signal $TE_{S3}$ (FIG. 1) to debugging unit 130 in response to register address signal $RA_{S3}$. Logic analyzer 132 transitions debugging unit 130 to the static storage operating state in response trigger event signal $TE_{S3}$."

"It is to be appreciated that the processing of trigger instruction signal $TI_{S1}$, data instruction signals $DI_{S1}$, trigger instruction signal $TI_{S2}$, and trigger instruction signal $TI_{S3}$ by processor core 120 transitions debugging unit 130 to the base operating state and the static storage operating state, and selectively transitions debugging unit 130 to the dynamic storage operating state. Consequently, upon the completion of processing instruction stream $IS_3$ by processor core 120, any trace data TRD stored within trace array 131 is representative of the results of processing testcase 151 by processor core 120."

Figure 4A:
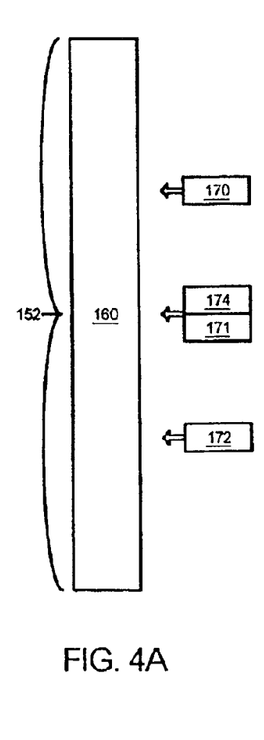
FIG. 4A is a block diagram of third embodiment of a testcase in accordance with the present invention.
Figure 4B:
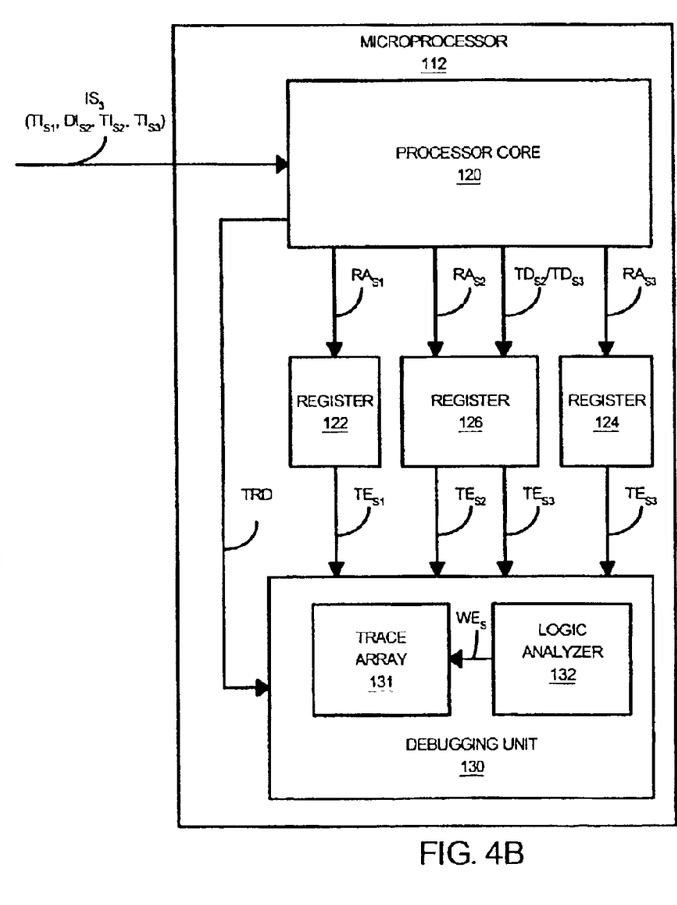
FIG. 4B is a block diagram of a fourth embodiment of a microprocessor in accordance with the present invention.

"Referring to FIGS. 4A and 4B, a testcase 152 and a microprocessor 112 in accordance with an instruction set architecture of the present invention is shown. Testcase 152 includes operating instructions 160 (FIG. 2A), triggering instruction 170 (FIG. 2A), a set of operating instructions 174, triggering instruction 171 (FIG. 2A), and triggering instruction 172 (FIG. 2A). Operating instructions 174 are to generate a first trigger data or a second trigger data. Triggering instruction 170 and triggering instruction 172 are strategically embedded within operating instructions 160 to transition debugging unit 130 to the base operating state and the static storage operating state, respectively. Operating instructions 174 and triggering instruction 171 are sequentially and strategically embedded within operating instructions 160 to selectively transition debugging unit 130 to the dynamic storage operating state or the base operating state."

Testcase 152 is coded within main memory 41 or cache 42 (FIG. 1). Processor core 120 fetches an instruction stream $IS_3$ including operating signals (not shown) that are representative of operating instructions 160, trigger instruction signal $TI_{S1}$ (FIG. 2B), a data instruction signal $DI_{S2}$, trigger instruction signal $TI_{S2}$ (FIG. 2B), and a trigger instruction signal $TI_{S3}$ (FIG. 2B).

Processor core 120 includes register 122 (FIG. 2B), register 124 (FIG. 2B), and a register 126. Register 122, register 124, and register 126 are shown as being separate from processor core 120 to simplify the description of processor core 120.

Processor core 120 provides register address signal $RA_{S1}$ to register 122 in response to trigger instruction signal $TI_{S1}$. Register 122 provides trigger event signal $TE_{S1}$ (FIG. 1) to debugging unit 130 in response to register address signal $RA_{S1}$. Logic analyzer 132 transitions debugging unit 130 to the base operating state in response to trigger event signal $TE_{S1}$.

In response to data instruction signals $DI_{S2}$, processor core 120 provides either a trigger data signal $TD_{S2}$ to register 126 when processor core 120 generates the first trigger data, or provides a trigger data signal $TD_{S2}$ to register 126 when processor core 120 generates the second trigger data. Subsequent to a provision of either trigger data signal $TD_{S2}$ or trigger data signal $TD_{S3}$ by processor core 120, processor core 120 provides register address signal $RA_{S2}$ to register 126 in response to trigger instruction signal $TI_{S2}$. Register 126 provides trigger event signal $TE_{S2}$ (FIG. 1) to debugging unit 130 in response to register address signal $RA_{S2}$ and trigger data signal $TD_{S2}$. Logic analyzer 132 transitions debugging unit 130 to the dynamic storage operating state in response to trigger event signal $TE_{S2}$. Register 126 provides trigger event signal $TE_{S3}$ (FIG. 1) to debugging unit 130 in response to register address signal $RA_{S2}$ and trigger data signal $TD_{S3}$. Logic analyzer 132 transitions debugging unit 130 to the static storage operating state in response to trigger event signal $TE_{S3}$.

"Processor core 120 provides register address signal $RA_{S3}$ to register 124 in response to trigger instruction signal $TI_{S3}$. Register 124 provides trigger event signal $TE_{S3}$ (FIG. 1) to debugging unit 130 in response to register address signal $RA_{S3}$. Logic analyzer 132 transitions debugging unit 130 to the static storage operating state in response trigger event signal $TE_{S3}$."

"It is to be appreciated that the processing of trigger instruction signal $TI_{S1}$, data instruction signal $DI_{S2}$, trigger instruction $TI_{S2}$, and trigger instruction signal $TI_{S3}$, by processor core 120 transitions debugging unit 130 to the base operating state and the static storage operating state, and selectively transition debugging unit 130 to either the dynamic storage operating state or the base operating state. Consequently, upon the completion of processing instruction stream $IS_3$ by processor core 120, any trace data TRD stored within trace array 131 is representative of the results of processing testcase 152 by processor core 120."

"From the previous descriptions of the present invention in connection with FIGS. 2A–4B, one skilled in the art will know how to make and use other embodiments of test cases and microprocessors in accordance with the present invention. For example, one skilled in the art will know how to make and use a test case including one or more triggering instructions 170 (FIG. 2A); one or more triggering instructions 171 (FIG. 2A); one or more triggering instructions 172 (FIG. 2A); one or more sets of operating instructions 173 (FIG. 3A); and/or one or more sets of operating instructions 174 (FIG. 4A). Also by example, one skilled in the art will know how to make and use a microprocessor including one or more registers 122 (FIG. 2B); one or more registers 123 (FIG. 2B); one or more registers 124 (FIG. 2B); one or more registers 125 (FIG. 3B); and/or one or more registers 126 (FIG. 4B)."

Thus, the present invention provides a structure and method for placing special triggering instructions only in those selected locations where there is a desire to capture a trace of the failing instruction stream. This is in contrast to the prior art where the marking of general instructions can initiate numerous unintended and undesirable triggers from the processor core to the debugging unit, in that the instructions subject to such marking can occur many times in the instruction stream and not just in the failing case where debugging is desired.

Though the invention has been described in the context of a uniprocessor core, the underlying concepts as claimed herein are equal applicable and beneficial in a multiprocessor system with multiple individual processor cores.

While the embodiments of the present invention disclosed herein are presently considered to be preferred, various changes and modifications can be made without departing from the spirit and scope of the invention. The scope of the invention is indicated in the appended claims, and all changes that come within the meaning and range of equivalents are intended to be embraced therein.

What is claimed is:

1. A method for transitioning a debugging unit between a plurality of operating states, comprising:
 defining a first set of operating instructions to be processed by a processor core;
 defining a first triggering instruction to provide a first signal to the debugging unit whereby the debugging unit is operable to transition from a first operating state to a second operating state;
 embedding said first triggering instruction within said first set of operating instructions, and;
  defining a second triggering instruction to provide a second signal to the debugging unit whereby the debugging unit is operable to transition from the second operating state to a third operating state; and
  embedding said second triggering instruction within said first set of operating instructions.

2. The method of claim 1, further comprising:
 coding said first set of operating instructions within a computer readable medium, said coded first set of operating instructions including a coded first triggering instruction;
 operating said computer readable medium to provide an instruction stream to a processor core, said instruction stream representative of said coded first set of operating instructions, said instruction stream including a second signal representative of said coded first triggering instruction; and
 operating said processor core to provide said first signal to the debugging unit in response to said second signal to thereby transition the debugging unit from the first operating state to the second operating state.

3. The method of claim 1, further comprising:
 defining a second triggering instruction to provide a second signal to the debugging unit whereby the debugging unit is operable to transition from the second operating state to the first operating state; and
 embedding said second triggering instruction within said first set of operating instructions.

4. The method of claim 3, further comprising:
 coding said first set of operating instructions within a computer readable medium, said coded first set of operating instructions including a coded first triggering instruction and a coded second triggering instruction;
 operating said computer readable medium to provide an instruction stream to a processor core, said instruction stream representative of said coded first set of operating instructions, said instruction stream including a third signal representative of said coded first triggering instruction and a fourth signal representative of said coded second triggering instruction;
 operating said processor core to provide said first signal to the debugging unit in response to said third signal to thereby transition the debugging unit from the first operating state to the second operating state; and
 subsequent to providing said first signal to the debugging unit, operating said processor core to provide said second signal to the debugging unit in response to said fourth signal to thereby transition the debugging unit from the second operating state to the first operating state.

5. The method of claim 1, further comprising:
 defining a second set of operating instructions to generate a first data or a second data; and
 embedding said second set of operating instructions within said first set of operating instructions.

6. The method of claim 5, further comprising:
 coding said first set of operating instructions within a computer readable medium, said first set of operating instructions including a coded first triggering instruction and a coded second set of operating instructions;
 operating said computer readable medium to provide an instruction stream to a processor core, said instruction stream representative of said coded first set of operating instructions, said instruction stream including a second signal representative of said coded first triggering instruction and a set of signals representative of said coded second set of operating instructions;
 operating said processor core to generate said first data or said second data in response to said set of signals; and
 subsequent to a generation of said first data by said processor core, operating said processor core to provide said first signal to the debugging unit in response to said second signal to thereby transition the debugging unit from the first operating state to the second operating state.

7. The method of claim 1, further comprising:
 further defining said first triggering instruction to provide a second signal to the debugging unit whereby the debugging unit is operable to transition from the first operating state to a third operating state;
 defining a second set of operating instructions to generate either a first data or a second data; and
 embedding said second set of operating instructions within said first set of operating instructions.

8. The method of claim 7, further comprising:
 coding said first set of operating instructions within a computer readable medium, said first set of operating instructions including a coded first triggering instruction, and a coded second set of operating instructions;

operating said computer readable medium to provide an instruction stream to a processor core, said instruction stream representative of said coded first set of operating instructions, said instruction stream including a third signal representative of said coded first triggering instruction, and a set of signals representative of said coded second set of operating instructions;

operating said processor core to generate either said first data or said second data in response to said set of signals;

subsequent to a generation of said first data by said processor core, operating said processor core to provide said first signal to the debugging unit in response to said third signal to thereby transition the debugging unit from the first operating state to the second operating state; and subsequent to a generation of said second data by said processor core, operating said processor core to provide said second signal to the debugging unit in response to said third signal to thereby transition the debugging unit from the first operating state to the third operating state.

9. A microprocessor, comprising:

a debugging unit operable to transition from a first operating state to a second operating state in response to a first signal;

a processor core operable to fetch an instruction stream including a second signal representative of a first triggering instruction to transition said debugging unit from said first operating state to said second operating state, said processor core further operable to provide said first signal to said debugging unit in response to said second signal, said debugging unit is further operable to transition from said second debugging operating state to a third debugging operating state in response to a third signal;

said instruction stream further includes a fourth signal representative of a second triggering instruction to transition said debugging unit from said second debugging operating state to said third debugging operating state; and said processor core is further operable to provide said third signal to said debugging unit in response to said fourth signal.

10. The microprocessor of claim 9, wherein said processor core includes a register operable to provide said first signal to said debugging unit in response to the third signal including an address of said register.

11. The microprocessor of claim 9, wherein said debugging unit is further operable to transition from said second operating state to said first operating state in response to the third signal;

said instruction stream further includes the fourth signal representative of the second triggering instruction to transition said debugging unit from said second operating state to said first operating state; and said processor core is further operable to provide said third signal to said debugging unit in response to said fourth signal.

12. The microprocessor of claim 11, wherein said processor core includes a first register operable to provide said first signal to said debugging unit in response to a fifth signal including an address of said first register; and a second register operable to provide said third signal to said debugging unit in response to a sixth signal including an address of said second register.

13. The microprocessor of claim 9, wherein said processor core includes a first register operable to provide said first signal to said debugging unit in response to a fifth signal including an address of said first register; and a second register operable to provide said third signal to said debugging unit in response to a sixth signal including an address of said second register.

14. The microprocessor of claim 9, wherein said instruction stream further includes a set of signals representative of a set of operating instructions to operate said processor core to generate a first data or a second data;

said processor core is further operable to generate said first data or said second data in response to said set of signals; and subsequent to a generation of said trigger data, said processor core is further operable to provide said first signal to said debugging unit in response to said second signal.

15. The microprocessor of claim 14, wherein said processor core includes a register operable to provide said second signal to said debugging unit in response to the third signal including an address of said register and the fourth signal including said first data.

16. The microprocessor of claim 9, wherein said debugging unit is further operable to transition from said first operating state to a third operating state in response to the third signal;

said first trigger instruction is to selectively transition said debugging unit from said first operating state to said second operating state or to transition said debugging unit from said first operating state to said third operating state;

said instruction stream further includes a set of signals representative of a set of operating instructions to operate said processor core to generate a first data or a second data;

said processor core is further operable to selectively generate said first trigger data or said second trigger data in response to said set of signals;

subsequent to a generation of said first data, said processor core is further operable to provide said first signal to said debugging unit in response to said second signal; and subsequent to a generation of said second data, said processor core is operable to provide said third signal to said debugging unit in response to said second signal.

17. The microprocessor of claim 16, wherein said processor core includes a register operable to provide said first signal to said debugging unit in response to the fourth signal including an address of said register and a fifth signal including said first data, and operable to provide said third signal to said debugging unit in response to a sixth signal including an address of said register and a seventh signal including said second data.

18. A computer readable medium storing computer readable code which is executable for transitioning a debugging unit between a plurality of operating states, comprising:

a first computer readable code to operate a processor core;

a second computer readable code to transition the debugging unit from a first operating state to a second operating state, said second computer readable code embedded within said first computer readable code; and a third computer readable code to transition the debugging unit from said second operating state to a third operating state, said third computer readable code embedded within said first computer readable code.

19. The computer readable medium of claim 18, further comprising:

the third computer readable code to operate said processor core to generate a first data or a second data, said third computer readable code embedded within said first computer readable code, wherein said second computer readable code is to transition the debugging unit from said first operating state to said second operating state in response to a generation of said first data.

20. The computer readable medium of claim 18, further comprising:

the third computer readable code to operate said processor core to generate a first data or a second data, said third computer readable code embedded within said first computer readable code, wherein said second computer readable code is to transition the debugging unit from said first operating state to said second operating state in response to a generation of said first data, and wherein said second computer readable code is to transition the debugging unit from said first operating state to a third operating state in response to a generation of said second data.

21. A system for transitioning a debugging unit between a plurality of operating states, comprising:

a computer readable medium including a first computer readable code to transition the debugging unit from a first operating state to a second operating state, said computer readable medium operable to provide a first signal representative of said first computer readable code;

a processor core operable to provide a second signal to the debugging unit in response to said first signal whereby the debugging unit is operable to transition from the first operating state to the second operating state wherein said processor core includes a register operable provide said second signal in response to a third signal including an address of said register; and said computer readable medium further includes a second computer readable code to transition the debugging unit from the second operating state to a third operating state, said computer readable medium operable to provide a third signal representative of said second computer readable code; and said processor core is further operable to provide a fourth signal to the debugging unit in response to said third signal whereby the debugging unit is operable to transition from the second operating state to the third operating state.

22. The system of claim 21, wherein said computer readable medium further includes a second computer readable code to transition the debugging unit from the second operating state to the first operating state, said computer readable medium operable to provide a third signal representative of said second computer readable code; and said processor core is further operable to provide a fourth signal to the debugging unit in response to said third signal whereby the debugging unit is operable to transition from the second operating state to the first operating state.

23. The system of claim 22, wherein said processor core includes a first register operable to provide said second signal to the debugging unit in response to a fifth signal including an address of said first register; and a second register operable to provide said fourth signal to the debugging unit in response to a sixth signal including an address of said second register.

24. The system of claim 21, wherein said processor core includes a first register operable to provide said second signal to the debugging unit in response to a fifth signal including an address of said first register; and a second register operable to provide said fourth signal to the debugging unit in response to a sixth signal including an address of said second register.

25. The system of claim 21, wherein said computer readable medium further includes a second computer readable code to operate said processor core to generate a first trigger data or a second trigger data, said computer readable medium operable to provide a set of signals representative of said second computer readable code;

said processor core is further operable to selectively generate said trigger data in response to said set of signals; and subsequent to a generation of said first data, said processor core is operable to provide said first signal to the debugging unit in response to said second signal.

26. The system of claim 25, wherein said processor core includes a register operable to provide said second signal to the debugging unit in response to a third signal including an address of said register and a fourth signal including said trigger data.

27. The system of claim 21, wherein said first computer readable code is to selectively transition the debugging unit from the first operating state to the second operating state or from the first operating state to a third operating state;

said computer readable medium further includes a second computer readable code to operate said processor core to generate a first data or a second data, said computer readable medium operable to provide a set of signals representative of said second computer readable code;

said processor core is further operable to selectively generate said first data or said trigger data in response to said set of signals;

subsequent to a generation of said first data, said processor core is operable to provide said second signal to the debugging unit in response to said first signal; and subsequent to a generation of said second data, said processor core is operable to provide a fourth signal to the debugging unit in response to said first signal whereby the debugging unit is operable to transition from the first operating state to the third operating state.

28. The system of claim 27, wherein said processor core includes a register operable to provide said second signal to the debugging unit in response to a fourth signal including an address of said register and a fifth signal including said first data, and to provide said third signal to the debugging unit in response to a sixth signal including said address of said register and a seventh signal including said second data.

29. A method for transitioning a debugging unit between a plurality of operating states, comprising:

receiving a first signal representative of a first triggering instruction to transition the debugging unit from a first operating state to a second operating state;

processing said first signal to thereby transition the debugging unit from said first operating state to said second operating state; and receiving a second signal representative of a second triggering instruction to transition the debugging unit from said second operating state to a third operating state; and processing said second signal to thereby transition the debugging unit from said second operating state to said third operating state.

30. The method of claim 29, receiving a second signal representative of a second triggering instruction to transition the debugging unit from said second operating state to said first operating state; and processing said second signal to thereby transition the debugging unit from said second operating state to said first operating state.

31. A method for transitioning a debugging unit between a plurality of operating states, comprising:

receiving a set of operating signals representative of a set of operating instructions to generate a first data or a second data;

receiving a trigger instruction signal representative of a triggering instruction to transition the debugging unit from a first operating state to a second operating state in response to a generation of said first data and to transition the debugging unit from said first operating state to a third operating state in response to a generation of said second data; and processing said set of operating signals and said trigger instruction signal to thereby transition the debugging unit from said first operating state to said second operating state in response to a generation of said first data and to thereby transition the debugging unit from said first operating state to said third operating state in response to a generation of said second data.

32. A method, comprising:

providing a computer readable medium operable to provide a set of operating signals representative of a set of operating instructions to generate a first data or a second data, and a trigger instruction signal representative of a triggering instruction to transition said debugging unit from a first operating state to a second operating state or to transition said debugging unit from said first operating state to a third operating state;

providing a processor core operable to generate said first data or said trigger data in response to said set of operating signal, to provide a first triggering signal subsequent to a generation of said first data in response to said triggering instruction signal, and to provide a second triggering signal subsequent to a generation of said second data in response to said triggering instruction signal; and providing a debugging unit operable to transition from said first operating state to said second operating state in response to said first triggering signal and to transition from said first operating state to said third operating state in response to said second triggering signal.

* * * * *